(12) United States Patent
Mateo (10) Patent No.: US 12,092,335 B2
(45) Date of Patent: Sep. 17, 2024

(54) COMBUSTION MODULE FOR A TURBOMACHINE

(71) Applicant: SAFRAN CERAMICS, Le Haillan (FR)

(72) Inventor: Julien André Roger Mateo, Moissy-Cramayel (FR)

(73) Assignee: Safran Ceramics, Le Haillan (FR)

( * ) Notice: Subject to any disclaimer, the term of this patent is extended or adjusted under 35 U.S.C. 154(b) by 0 days.

(21) Appl. No.: 18/254,485

(22) PCT Filed: Nov. 26, 2021

(86) PCT No.: PCT/FR2021/052113
§ 371 (c)(1),
(2) Date: May 25, 2023

(87) PCT Pub. No.: WO2022/112726
PCT Pub. Date: Jun. 2, 2022

(65) Prior Publication Data
US 2024/0053016 A1 Feb. 15, 2024

(30) Foreign Application Priority Data
Nov. 30, 2020 (FR) ...................................... 2012392

(51) Int. Cl.
*F23R 3/50* (2006.01)
*F23R 3/00* (2006.01)
(Continued)

(52) U.S. Cl.
CPC ................ *F23R 3/50* (2013.01); *F23R 3/007* (2013.01); *F23R 3/54* (2013.01); *F23R 3/60* (2013.01); *F23R 2900/00017* (2013.01)

(58) Field of Classification Search
CPC .... F23R 3/60; F23R 3/50; F23R 3/007; F02C 3/145
See application file for complete search history.

(56) References Cited

U.S. PATENT DOCUMENTS 6,339,923 B1 * 1/2002 Halila ..................... F23R 3/50
60/738
2010/0139283 A1 6/2010 Phillips et al.
(Continued)

FOREIGN PATENT DOCUMENTS

JP 3331826 B2 10/2002

OTHER PUBLICATIONS

International Search Report mailed Apr. 12, 2022, issued in corresponding International Application No. PCT/FR2021/052113, filed Nov. 26, 2021, 6 pages.
(Continued)

*Primary Examiner* — Gerald L Sung
(74) *Attorney, Agent, or Firm* — Christensen O'Connor Johnson Kindness PLLC (57) ABSTRACT

A combustion module for a turbomachine is provided and includes an annular casing extending about a longitudinal axis; an annular combustion chamber located inside the casing and comprising coaxial annular walls connected to one another by an annular chamber dome, the walls and the chamber dome consisting of at least two annular envelopes, which are made of a ceramic-matrix composite material. The module can include anti-disengagement devices to keep the annular edges pressing axially against one another and fuel injectors borne by the casing and engaged in apertures of one of the envelopes.

10 Claims, 5 Drawing Sheets

(51) Int. Cl.
    *F23R 3/54*        (2006.01)
    *F23R 3/60*        (2006.01)

(56) References Cited

U.S. PATENT DOCUMENTS

2014/0311152 A1    10/2014    Prociw et al.
2018/0238232 A1     8/2018    Reynolds et al.
2020/0116360 A1*   4/2020    White .................... F23R 3/002

OTHER PUBLICATIONS

Written Opinion mailed Apr. 12, 2022, issued in corresponding International Application No. PCT/FR2021/052113, filed Nov. 26, 2021, 5 pages.

* cited by examiner

COMBUSTION MODULE FOR A TURBOMACHINE

CROSS-REFERENCE TO RELATED APPLICATIONS

This application is a National Stage of International Application No. PCT/FR2021/052113, filed Nov. 26, 2021, which claims priority to French Patent Application No. 2012392, filed Nov. 30, 2020, the entire disclosures of which are hereby incorporated by reference in their entirety for all purposes.

TECHNICAL FIELD OF THE INVENTION

The present invention relates to a combustion module for a turbomachine, and more particularly to the configuration and the mounting of walls in ceramic matrix composite material (CMC) of a combustion chamber of the combustion module.

TECHNICAL BACKGROUND

The prior art comprises, in particular, the documents US-A1-2018/238232, JP-B2-3331826 and US-A1-2010/139283.

Generally speaking, a turbomachine, in particular of an aircraft, comprises a gas generator comprising one or more compressors, for example low pressure and high pressure, arranged upstream of a combustion module.

Figure 1:
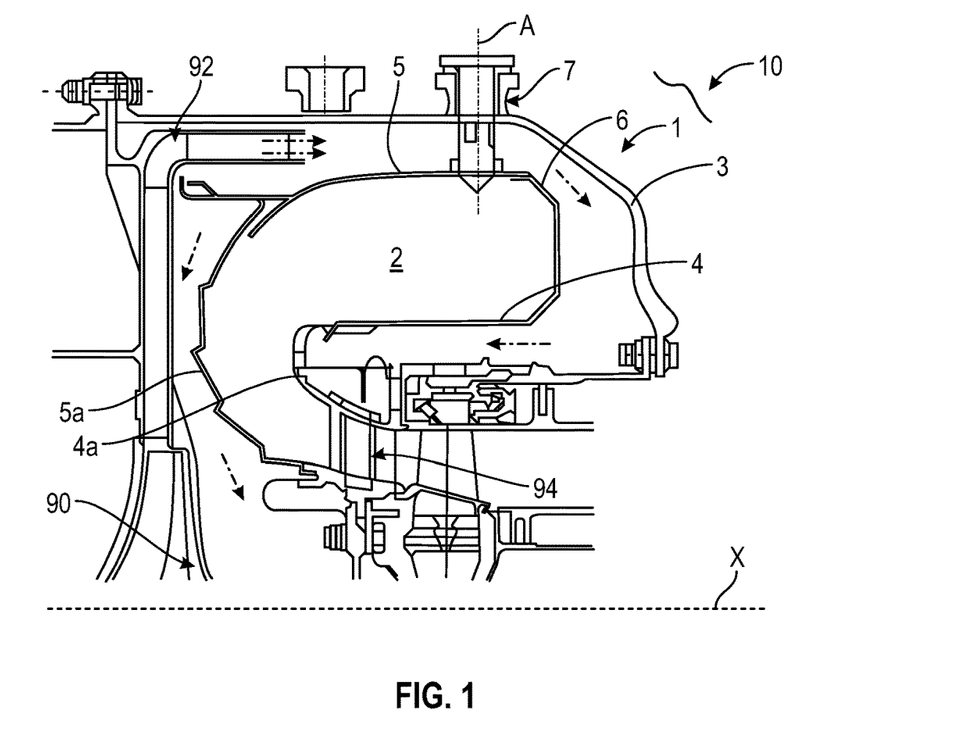
FIG. 1 is a schematic half-view in axial cross-section of a combustion module of a turbomachine comprising a return combustion chamber according to the prior art.

With reference to FIG. 1, a combustion module 1 of a turbomachine 10, in particular of an aircraft, has a longitudinal axis X which may be coincident with a longitudinal axis of the turbomachine 10. The module 1 comprises a combustion chamber 2 which has an annular shape. In the example, the chamber 2 extends around the axis X and is surrounded by an annular casing 3 which also extends around the axis X.

The chamber 2 is delimited by coaxial internal 4 and external 5 annular walls joined by a bottom chamber 6. The external wall 5 is attached to the casing 3 which carries an annular row of fuel injectors 7 so as to supply the chamber 2 with fuel. In the example, each injector 7 passes through an axis A which is perpendicular to the axis X.

A portion of the compressed air from a centrifugal compressor 90 via an annular diffuser 92 enters into the chamber 2 and is mixed with the fuel supplied by the injectors 7. Another portion of this air circulates around the chamber and is illustrated by arrows in FIG. 1. The combustion of the air/fuel mixture is initiated in the chamber 2 by an ignition device (not shown) and generates a combustion in the bottom chamber 6.

FIG. 1 shows a return chamber 2, where the bottom chamber 6 is located downstream. In addition, the internal and external annular walls 4, 5 of the chamber 2 extend radially towards the interior of the module 1 (with respect to the axis X) through a turnaround 4a, 5a to feed the combustion gases from the chamber 2 towards a turbine stator 94. The turnaround 4a, 5a comprises an internal bend 4a connected to the internal wall 4 and an external bend 5a connected to the external wall 5.

It should be noted that a direct, i.e. normal flow, combustion chamber comprises a bottom chamber located upstream and an outlet located downstream that opens out into the turbine stator of the turbomachine.

FIG. 1 shows a return combustion chamber in which the bottom chamber is located on the downstream side and the turnaround provided at the outlet of the chamber allows the combustion gases to be redirected into the turbine stator.

In the frame of the design and the integration of a combustion module, the architecture of the combustion chamber can be separated into several parts to facilitate in particular the manufacture and/or the operability of the combustion module. This can lead to problems in assembling the different parts that are manufactured separately in an extremely thermally and mechanically constrained environment.

The combustion chamber is usually made of a metallic material that allows the separately manufactured parts to be assembled by mechanical connection (such as bolts), welding or brazing.

The combustion chamber can also be made of a composite material (such as a CMC ceramic matrix composite) comprising assemblies of parts with both connections referred to as "hybrid", i.e. a part made of a metallic material connected to a part made of a composite material that can withstand differential expansion, and connections between two parts made of a composite material.

The use of composite materials is particularly advantageous in the field of the turbomachines, as these materials are relatively light and have a better temperature resistance, which allows them to save cooling air or to operate at higher temperatures.

In the case of a combustion chamber made of CMC material, an assembling of parts made of CMC material is usually made by bolt-type attachments. This bolt assembling is relatively bulky and can be complex to implement in the environment of the combustion module, which has mechanical, thermomechanical and chemical stresses. For example, it is necessary to ensure a reliable tightening at all operating points and to provide an anti-rotation device for the bolt. These difficulties in assembling CMC material parts can generally impact on the performance or the integrity of the combustion chamber (and consequently of the turbomachine).

In this context, it is useful to overcome at least partly the above-mentioned disadvantages by proposing a simpler solution for assembling at least two parts made of a CMC-type composite material in a combustion module of a turbomachine.

SUMMARY OF THE INVENTION

To this end, the invention proposes a combustion module for a turbomachine, in particular of an aircraft, comprising:
  an annular casing extending around a longitudinal axis X,
  an annular combustion chamber located inside the casing and comprising coaxial annular walls, internal and external respectively, connected to each other by an annular bottom chamber, said walls and said bottom chamber being formed by at least two annular envelopes which are made of ceramic matrix composite material and which comprise annular edges fitted together one inside the other and in axial abutment on each other.

According to the invention, the combustion module further comprises anti-disengagement devices configured to maintain the annular edges in axial abutment with each other, these devices being carried by the combustion chamber and/or the casing.

The anti-disengagement devices according to the invention have several advantages. In particular, they allow the envelopes in CMC material (forming the annular walls and the bottom chamber) to be positioned and assembled together in a simple and efficient manner, while preventing their disassociation during operation.

In a hot operating phase of the combustion module (e.g. above 1000° C.), there is a pressure difference between the outside and the inside of the combustion chamber which maintains the two assembled elements (i.e. the CMC material envelopes) in contact.

An anti-disengagement device prevents the disassembling of the connection in the cases where the pressure difference is not sufficient to maintain the elements in contact, such as when the turbine is at a standstill.

This type of connection is less bulky and requires little or no adaptation in the combustion module.

In general, the use of pressure difference to maintain the elements in contact, supplemented by an anti-disengagement device, is an alternative solution to rigid connections such as the bolts and non-detachable connections such as welds or brazes.

The chamber according to the invention may comprise one or more of the following characteristics, taken alone or in combination with each other:
- the module comprises a first envelope defining the internal wall and the bottom chamber, and a second envelope defining the external wall, said edges being located at the junction of the external wall to the bottom chamber;
- the annular edge of the first envelope comprises a scalloped shape;
- the module further comprises fuel injectors carried by the casing and engaged in orifices of one of the envelopes, said anti-disengagement devices being formed by washers which are mounted around the injectors and tightened radially against this envelope, and which comprise lugs configured to cooperate by abutment and/or hooking with the other of the envelopes;
- each of the washers is interposed between the envelope and a nut for tightening the washer against the envelope;
- each of the washers has a coefficient of thermal expansion which is therefore able to compensate for the expansion gap between the tightening nut and the CMC envelope;
- the nut is screwed onto a barrel of a tubular socket mounted around the injector, this socket comprising an annular abutment collar on a peripheral edge of the orifice in which the injector is engaged;
- each of the washers comprises two lugs, preferably oriented in substantially parallel directions;
- the lugs each have a shape complementary to that of the edge of the other envelope, and/or each have a hook shape for being engaged in an opening in that other envelope, so as to prevent relative displacement of the two elements in the axial orientation;
- the anti-disengagement devices are abutment members which are projectably formed on the casing of the turbine and comprise free ends configured to come in abutment on the combustion chamber, and in particular on the bottom chamber;
- each of said members is in the form of an elongated arm which can be inclined with respect to the engine axle, the free end of this arm comprising an abutment surface on the combustion chamber which extends in a plane substantially perpendicular to the surface of the bottom chamber;
- said abutment members are three to eight in number, distributed circumferentially around the axis X;
- the module comprises a clearance between each of said abutment members (in particular the free end of the arms) and the combustion chamber, for example said clearance is in the order of a millimetre;
- said abutment members are made of a composite, metal or metal alloy material;
- said abutment members and the casing are monoblocs;
- the combustion chamber is reverse flow;
- the casing carries an annular row of fuel injectors angularly distributed around the axis X;
- each of the injectors extends along an axis A perpendicular to the axis X;
- the first and second envelopes are extended upstream by a turnaround that extends radially towards the interior of the module;
- each of said abutment members is configured to be mounted with a clearance or with a preload;
- the free end of said abutment members is made of a material different from the material of the abutment members to ensure for example a chemical or thermal compatibility.

Advantageously, the anti-disengagement devices can be formed by both washers and abutment members, as described in at least one of the particularities of the invention.

The invention also relates to a turbomachine, in particular for aircraft, comprising a combustion module as described above.

The invention also relates to an aircraft comprising a fuselage and powered by at least one turbomachine comprising a combustion module as previously described.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

By convention, in the following description, the terms "longitudinal" and "axial" refer to the orientation of structural elements extending along the direction of a longitudinal axis, such as a longitudinal axis of a combustion module. The terms "radial" or "vertical" refer to an orientation of structural elements extending along a direction perpendicular to the longitudinal axis. The terms "inner" and "outer", and "internal" and "external" are used in reference to a positioning with respect to the longitudinal axis. Thus, a structural element extending along the longitudinal axis comprises an inner face facing the longitudinal axis and an outer surface opposite its inner surface. The terms "upstream" and "downstream" are defined in relation to the orientation of circulation of the gases in a turbomachine.

FIG. 1 has been described above and illustrates a combustion module 1 of a turbomachine 10 according to the prior art.

FIGS. 2 to 8 show several embodiments of a combustion module 1 according to the invention.

In the following description, the invention applies generally to a turbomachine 10, in particular for aircraft, such as a turbojet or turboprop engine.

The turbomachine 10 typically comprises a compressor module comprising at least one compressor, a turbine module comprising at least one turbine and the combustion module 1 interposed between the compression and turbine modules.

As described above, the combustion module 1 comprises an annular casing 3 extending around a longitudinal axis X and surrounding an annular combustion chamber 2. This axis X may be coincident with a longitudinal axis, such as a rotational axis of a rotor, of the turbomachine 10. The chamber 2 and the casing 3 extend around the axis X. The chamber 2 may extend parallel or at an angle with respect to the axis X.

Figure 2:
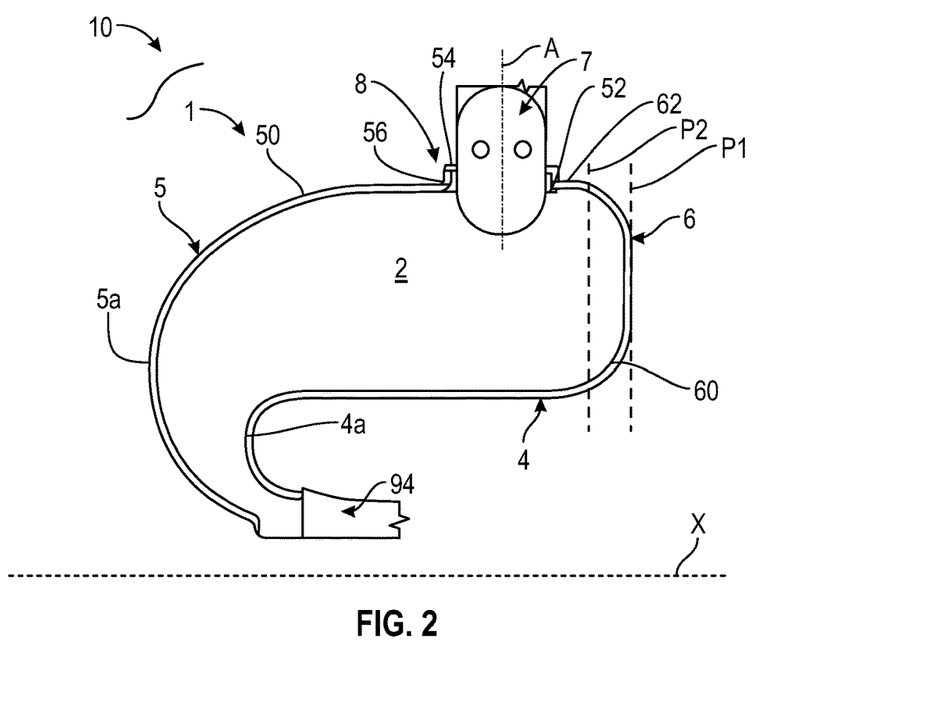
FIG. 2 is a partial schematic half view in axial cross-section of a first embodiment of a combustion module assembly according to the invention.

FIG. 2 shows schematically the chamber 2 comprising an internal annular wall 4 and an external annular wall 5. These walls 4, 5 are coaxial and connected by an annular bottom chamber 6. This chamber 2 is reverse flow. Thus, the bottom chamber 6 is arranged on the downstream side of the turbomachine and the chamber 2 opens out on the upstream side of the turbomachine towards the turbine module. Alternatively, when the chamber is direct, the bottom chamber 6 is arranged on the upstream side of the turbomachine. The bottom chamber 6 may comprise a transverse annular wall passing substantially through a first plane P1 which is perpendicular to the axis X.

The external wall 5 is attached to the casing 3 which carries an annular row of fuel injectors 7 angularly distributed around the axis X so as to supply the chamber 2 with fuel. In particular, the external wall 5 comprises an annular row of orifices 54 extending around the axis X. Each of the orifices 54 has an internal diameter $D_{54}$. Each of the orifices 54 comprises a peripheral edge 56. Each of the orifices 54 is suitable for receiving a fuel injector 7. In the example shown in FIG. 2, the injector 7 passes through an axis A which is substantially perpendicular to the axis X. Alternatively, the orifices 54 and the injectors 7 could be inclined or parallel to the axis X.

In the frame of the invention, the chamber 2 is made of a CMC ceramic matrix composite material. The internal and external walls 4, 5 and the bottom chamber 6 are formed by at least two annular envelopes 50, 60 made of a ceramic matrix composite material CMC.

In the example shown in FIG. 2, the internal annular wall 4 and the bottom chamber 6 are formed in one single piece by a first envelope 60. In the example, the first envelope 60 has a general inverted "S" shape, in which one of the two loops corresponds substantially to the bottom chamber and the other of the loops corresponds substantially to the internal wall 4 and the internal bend 4a of the chamber. The external annular wall 5 is formed in one single piece by a second envelope 50. In the example, the second envelope 50 has a general "C" shape, in which an upper portion substantially corresponds to the external wall 5 and a lower portion substantially corresponds to the external bend 5a.

In the example, the first and second envelopes 50, 60 are connected to each other on the downstream side. These envelopes 50, 60 continue on the upstream side with a turnaround 4a, 5a which extends radially towards the interior (with respect to the axis X) of the module 1, to open out into a dispenser 94 of the turbine module.

The first and second envelopes 50, 60 each comprise, respectively, an annular edge 62 referred to as internal, and an annular edge 52 referred to as external. The annular edges 52, 62 are fitted together one inside the other, in particular at the level of the connection between the external wall 5 and the bottom chamber 6. In particular, the internal edge 62 rests radially (or substantially radially) on the external edge 52. "Radial abutment" means an abutment force exerted by the internal edge 62 in a transverse plane (with respect to the axis X) on a cylindrical surface of the external edge 52. By "substantially radial abutment" is meant an abutment force exerted by the internal edge 62 along a plane inclined (with respect to the axis X) on a frustoconical surface of the external edge 52, in particular when the chamber 2 is inclined with respect to the axis X.

Furthermore, the edge 62 of the first envelope 60 (corresponding to the bottom chamber 6 in the example) may comprise a scalloped shape (not shown in the figures), in particular near the injectors 7. This allows in particular the chamber 2 to be compacted axially. The scalloped shape can be made by a sequence of projecting or re-entrant arc segments, such as undulations.

Figure 7:
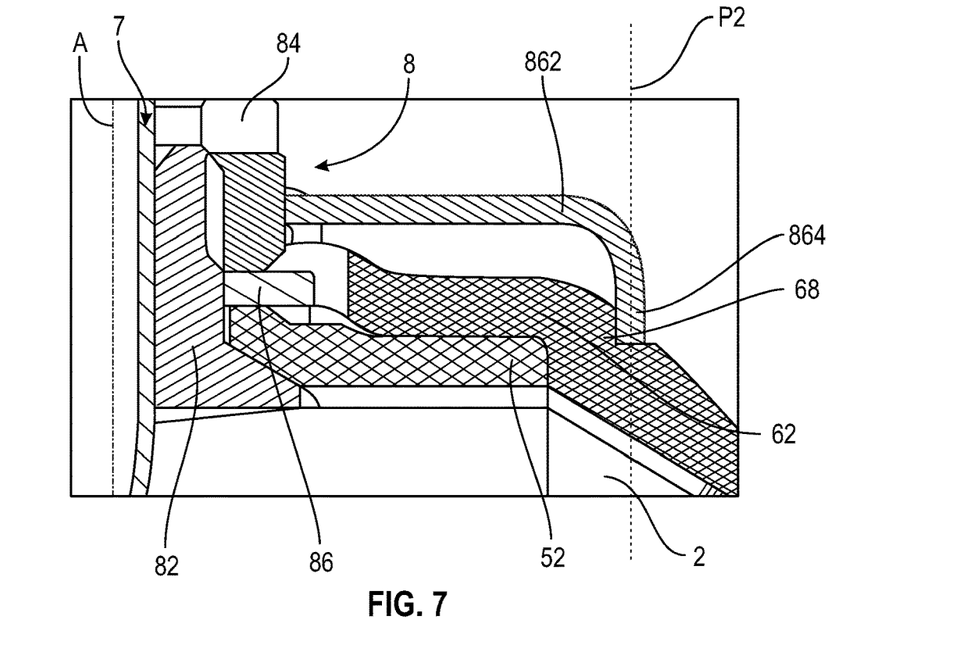
FIG. 7 is a partial schematic view in axial cross-section of an anti-disengagement device according to a third embodiment of the invention.
Figure 8:
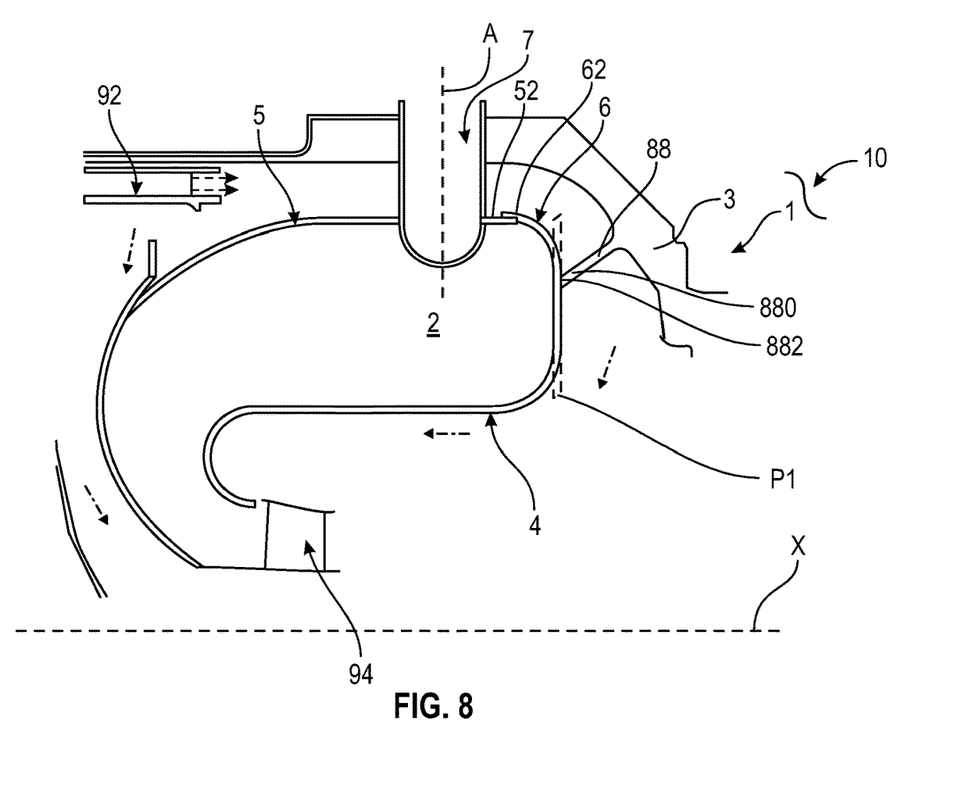
FIG. 8 is a schematic half-view in axial cross-section of a fourth embodiment of an anti-disengagement device equipping a combustion module according to the invention.

One of the particularities of the invention is that the combustion module 1 comprises anti-disengagement devices 8 carried by the chamber 2 (shown in FIG. 2 to 7) or carried by the casing 3 of the module 1 (shown in FIG. 8). Each of the devices 8 is used to maintain the annular edges 52, 62 in axial (or substantially axial) abutment with each other, or with a limited clearance. In this way, the envelopes 50, 60 of the chamber 2 are prevented from becoming disassociated during operation and at a standstill (and thus from being connected to the external wall 5 and the bottom chamber 6), while allowing a simple and efficient assembly and disassembly of the devices 8 within the available overall dimension of the combustion module 1.

"Axial abutment" means an abutment force or a contact exerted by the external edge 52 along the axis X on a cylindrical surface of the internal edge 62. By "substantially axial abutment" is meant an abutment force or a contact exerted by the external edge 52 along a plane inclined (with respect to the axis X) on a frustoconical surface of the internal edge 62, in particular when the chamber 2 is inclined with respect to the axis X; or conversely, an abutment force exerted by the internal edge 62 along a plane inclined (with respect to the axis X) on a frustoconical surface of the external edge 52.

According to a first embodiment of the invention, illustrated in FIGS. 2 to 5, the anti-disengagement devices 8 can be installed on the chamber 2. In particular, in these example figures, the devices 8 are mounted around the fuel injectors 7.

The devices 8 are each formed with a washer 86 which is configured to be fitted around the injector 7.

Figure 3:
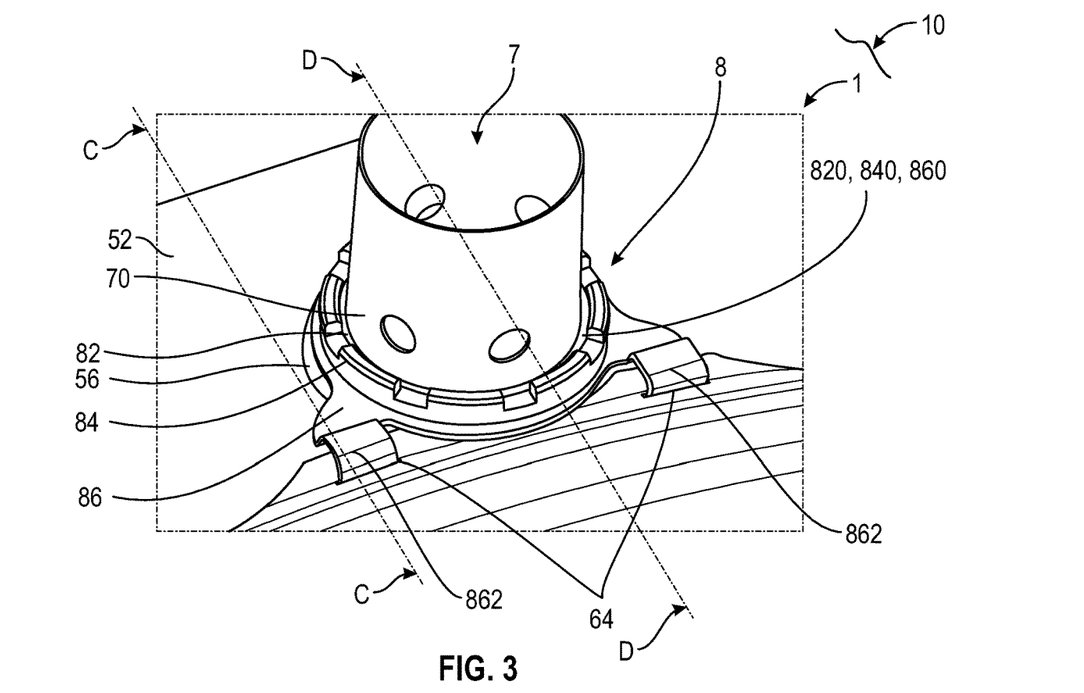
FIG. 3 is a schematic perspective view of the anti-disengagement device in FIG. 2.

With reference to FIG. 3, the washer 86 therefore has a generally annular and flat shape. This washer 86 comprises a first central opening 860 and lugs 862. The opening 860 has an internal diameter $D_{860}$.

The washer 86 may comprise one or more lugs 862. The number and the dimensions (shape, length, thickness, etc.) of the lugs 862 per washer 86 may vary depending on the dimensions and materials of the parts making up the combustion module 1. In the example shown in FIG. 3, the washer 86 comprises two lugs 862 which are oriented parallel to each other. These lugs 862 each have a hook shape.

The thickness of each washer 86 can determine their degree to which they help to maintain tightening forces, particularly during the flight phases of the turbomachine.

The washer 86 may be made of a CMC-type composite material or a metal alloy. Preferably, the washer 86 is made of stainless steel, for example of the A286 type. The advantages of stainless steel A286 are that it is compatible with the thermal environment of the combustion chamber 2, and has a high coefficient of thermal expansion to optimally maintain the connections between parts at extreme operating temperatures of the combustion module 1.

The washer 86 is configured to be tightened radially (i.e. substantially perpendicular to the axis X) against the second envelope 50 of the external wall 5 by a tightening nut 84 and a socket 82.

Figure 5:
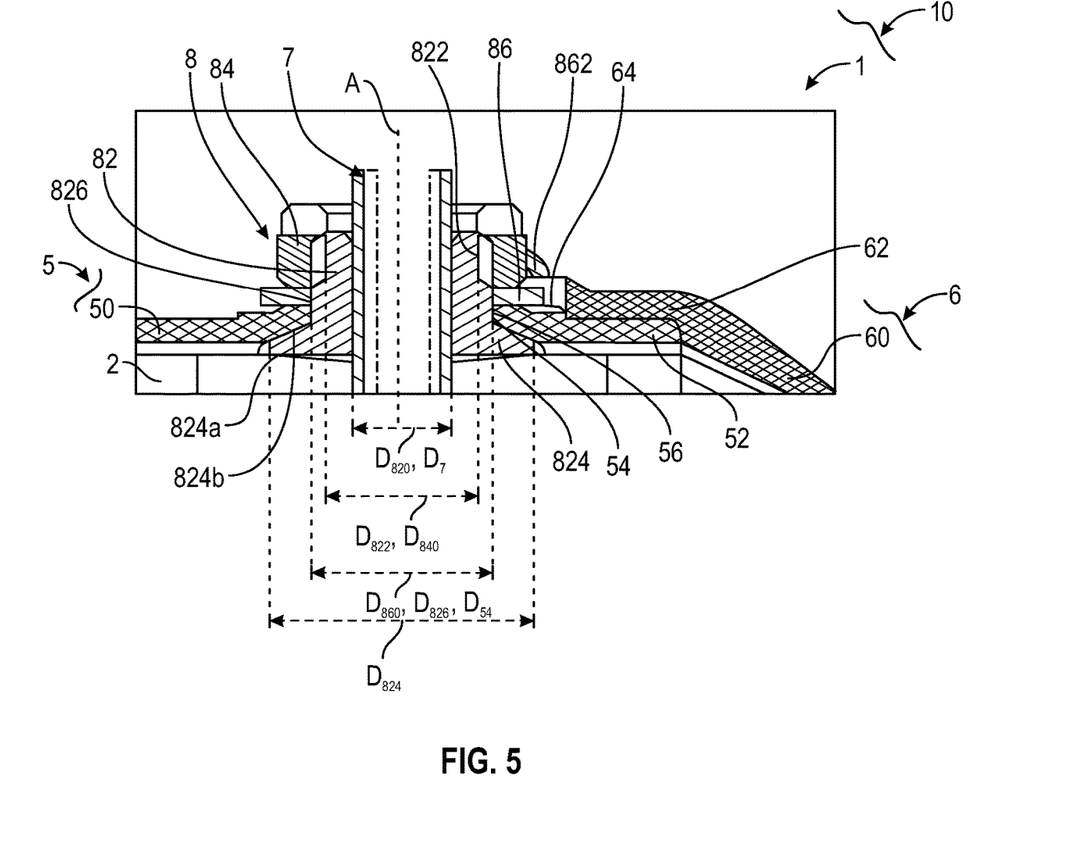
FIG. 5 is a schematic cross-sectional view along a plane D-D of FIG. 3.

With reference to FIG. 5, the socket 82 has a tubular shape and therefore comprises a second central opening 820 and a barrel 822. The second opening 820 has an internal diameter $D_{820}$. The barrel 822 may comprise an external thread.

The socket 82 also comprises an annular collar 824. The collar 824 and the barrel 822 may be delimited by a tubular portion 826. In the example shown in FIG. 5, the annular collar 824 comprises a first flank 824a which has a flat shape and a second flank 824b which has a frustoconical shape. The second flank 824b tapers towards the tubular portion 826.

In hot operation, the frustoconical shape of the second flank 824b of the annular collar 824 of the socket 82 may expand. This may result in a displacement relative to the envelope 50. This frustoconical shape of the second flank 824b may return a radial displacement relative to an axial displacement, leading to a tightening of the connection between the socket 82, the nut 84 and the envelope 50. The washer 86 may be made of a material having a coefficient of thermal expansion allowing to compensate for an expansion gap between the envelope 50 and the nut 84.

Furthermore, in the example shown in FIG. 5, the collar 824 has an external diameter $D_{824}$ which is greater than the external diameters $D_{826}$, $D_{822}$ of the tubular portion 826 and the barrel 822. The external diameter $D_{826}$ of the tubular portion 826 is greater than the external diameter $D_{822}$ of the barrel 822.

Figure 4:
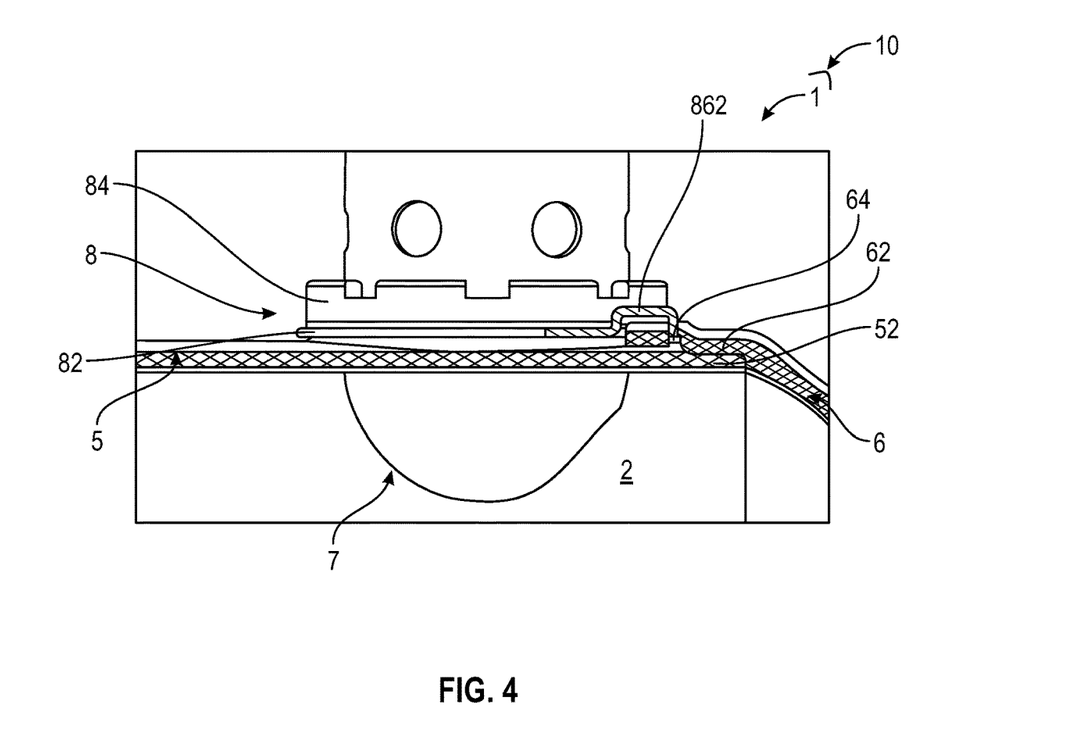
FIG. 4 is a schematic cross-section along a plane C-C of FIG. 3.

The assembly of the washer 86 of the first embodiment on the chamber 2, in particular around the injectors 7 and on the edges 52, 62 of the envelopes 50, 60, is now described with reference to FIGS. 3 to 5.

For this purpose, the socket 82 is mounted around the injector 7, in particular through the second opening 820. This second opening 820 thus extends around the axis A of the injector 7. In the example shown in FIG. 5, the internal diameter $D_{820}$ of the second opening 820 of the socket is therefore substantially similar to the external diameter D7 of the injector 7.

Next, the annular edge 52 of the second envelope 50 comprises the orifices 54 into which the injectors 7 are intended to be engaged. The edge 52 is mounted around the collar 824 of the socket 82, in particular through the orifices 54. This allows the peripheral edge 56 of the orifice 54 to be in abutment on the second flank 824b of the collar 824. In the example shown in FIG. 5, the peripheral edge 56 is in abutment on the second flank 824b along an inclined position with respect to the axis X and A. Furthermore, the external diameter $D_{826}$ of the tubular portion 826 of the socket 82 is substantially similar to the internal diameter $D_{54}$ of the orifice 54 of the second envelope 50.

The washer 86 is then mounted around the socket 82, in particular through the first opening 860. This first opening 860 also extends around the axis A. In the example shown in FIG. 5, the internal diameter $D_{860}$ of the first opening 860 of the washer is therefore substantially similar to the external diameter $D_{826}$ of the tubular portion 826 of the socket and the internal diameter $D_{64}$ of the orifice 54 of the second envelope 50. Furthermore, the annular edge 62 of the first envelope 60 comprises in the example openings 64 of complementary shape to the lugs 862 of the washer 86. This allows the hook-shaped lugs 862 to engage into the openings 64 of the first envelope 60, as shown in FIG. 4.

Finally, the nut 84 is screwed around the barrel 822 of the socket 82, in particular through a third opening 840 of the nut 84. This allows to ensure that the washer 86 and the edge 52 of the second envelope 50 are maintained on the socket 82. In the example shown in FIG. 5, the third opening 840 has an internal diameter D840 substantially similar to the external diameter $D_{822}$ of the barrel 822 of the socket 82. This third opening 840 may comprise an internal thread complementary to the external thread of the barrel 822 of the socket 82.

Figure 6:
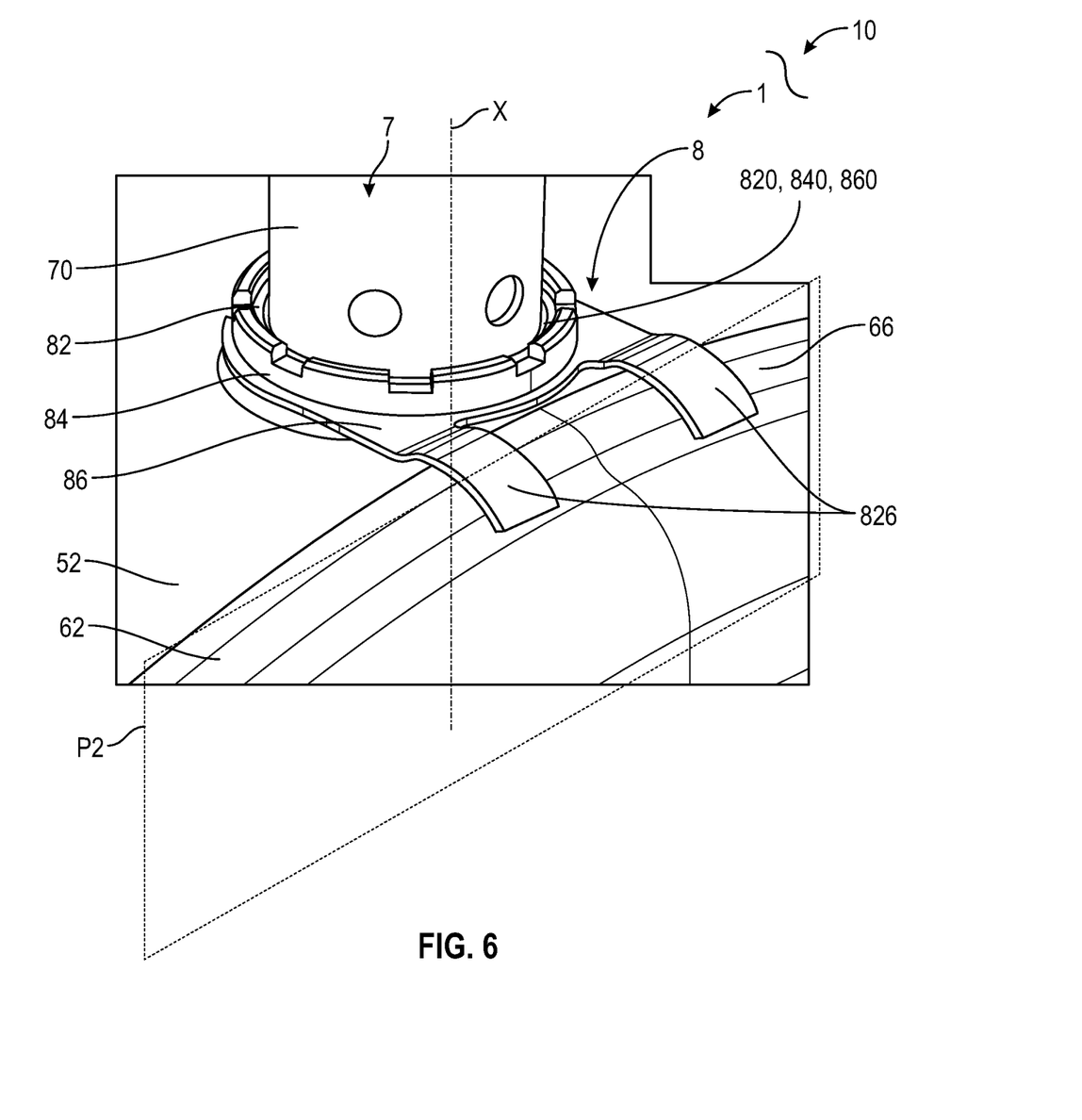
FIG. 6 is a schematic perspective view of an anti-disengagement device according to a second embodiment of the invention.

FIG. 6 illustrates one of the anti-disengagement devices 8 and its assembly according to a second embodiment, in which the anti-disengagement devices 8 can also be installed on the chamber 2.

The anti-disengagement devices 8 of the second embodiment are distinguished from the devices 8 of the first embodiment by the lugs 862 of the washer 86 and the edge 62 of the first envelope 60.

With reference to FIG. 6, the lugs 862 of the washer 86 have an elongated and curved shape. The edge 62 of the first envelope 60 comprises a boss 66 passing substantially through a second plane P2. This plane P2 is substantially perpendicular to the axis X of the module 1 and located upstream of the first plane P1 of the bottom chamber 6. Alternatively, the edge 62 may comprise an allowance of the envelope 60 at the level of the plane P2.

In FIG. 6, the lugs 862 and the boss 66 have a complementary shape. This allows the lugs 862 to attach to the boss 66 by direct abutment, so that the lugs 862 tightened radially against the edge 52 abut the boss 66 of the edge 62. This configuration therefore also allows the edges 52, 62 of the envelopes 50, 60 to be maintained axially against each other.

Preferably, the lugs 862 are elongated so that their free and curved ends face the plane P1 corresponding substantially to the transverse wall of the bottom chamber 6. In particular, this allows to compensate for axial displacement of the assembly of the edges 52, 62 during operation of the combustion module 1.

In addition, the elongated shape of the lugs 862 allows for flexibility in the connection between the lugs 862 and the boss 66. In this way, the assembly between the envelopes 50, 60 (of the walls 5, 6 and of the bottom chamber 6), is rigid in particular with permanent contact between the lugs 862 and the boss 66, and with little or no assembly clearance between the edges 52, 62 of the envelopes 50, 60.

This second embodiment has in particular the advantage of avoiding complex machining on the edge 62 of the first envelope 60.

FIG. 7 illustrates one of the anti-disengagement devices 8 and its assembly according to a third embodiment, in which these devices 8 can also be installed on the chamber 2.

The anti-disengagement devices 8 of the third embodiment are distinguished from the devices 8 of the first embodiment by the lugs 862 of the washer 86 and the edge 62 of the first envelope 60.

With reference to FIG. 7, the edge 62 of the first envelope 60 comprises at least one shoulder 68, so as to form an axial abutment surface for one of the lugs 862 of the washer 86. Preferably, the shoulder 68 is made on an allowance of the envelope 60 located substantially at the level of the plane P2. The lugs 862 and the shoulders 68 may have a complementary shape.

In FIG. 7, the lug 862 comprises a curved free end 864 engaging in the shoulder 68 of the edge 62. In this way, the lugs 862 are also attached in the shoulders 68 by direct axial abutment. Thus, this configuration also allows the edges 52, 62 to be maintained together.

This third embodiment is a simple alternative solution to carry out and to implement in order to prevent the connection of the envelopes 50, 60 from becoming disassociated.

According to a fourth embodiment of the invention, illustrated in FIG. 8, the anti-disengagement devices 8 may be carried by the casing 3. In particular, in this example in FIG. 8, the devices 8 and the casing 3 are monoblocs (i.e. from one material).

Advantageously, these devices 8 are abutment members projectably formed on the casing 3. These abutment members may comprise free ends 880 adapted to abut the chamber 2, in particular the bottom chamber 6. This configuration allows to prevent the bottom chamber 6 from any displacement relative to the external wall 5.

These abutment members can be made of a rigid or flexible material. For example, the abutment members are made of a composite, metal, or metal alloy material.

Preferably, the abutment members can be made of the same material as the casing 3 but with a first thickness reduced compared to a second thickness of the casing 3. In particular, this allows the abutment members to be flexible, while still being able to exert a sufficient pressure on the chamber 2 to maintain the edges 52, 62 in axial abutment on each other.

In the case of abutment members made of flexible material, the free ends 880 may come into direct contact with the bottom chamber 6. In the case of abutment members made of rigid or flexible material, a mounting clearance and/or a clearance to compensate for expansion during operation can be added between the abutment members and the bottom chamber. These mounting and expansion clearances may vary depending on the materials or dimensions (such as thickness) used for the envelopes and the abutment members. As an example, this mounting clearance and/or expansion compensation clearance is in the order of a millimetre.

The abutment members and the casing 3 can be made monobloc (i.e. from one material).

In FIG. 8, the abutment members are in the form of arms 88. The arm 88 has an elongated shape in the direction of the bottom chamber 6. The end 880 of the arm 88 may be inclined with respect to the axis X. This end 880 comprises an abutment surface 882 on the bottom chamber 6. In the example shown in FIG. 8, the abutment surface 882 passes substantially through the first plane P1.

The casing 3 may comprise between three and eight arms 88 distributed circumferentially around the axis X, so that an air flow from a diffuser 92 of the compressor module may circulate into the module 1.

In addition, the free ends 880 of the arms 88 may comprise a thermal protection coating. This allows in particular the temperature of the arms 88 to be lowered. This coating can be combined with a different material from the material used for making the abutment members. This allows for a chemical or thermal compatibility between the abutment members and the chamber.

This fourth embodiment of the devices 8 has the particular advantage of favouring the hyperstatism (i.e. making immovable) of the edges 52, 62 fitted together, and thus limiting the movements and/or deformations.

According to another embodiment (not shown in the figures), the abutment members of the fourth embodiment of FIG. 8 can be combined with the washers of at least one of the embodiments of FIGS. 2 to 7. Indeed, the devices 8 can be formed by both washers 86 and abutment members.

The anti-disengagement devices equipping the combustion module of the present invention are advantageous in particular for the following reasons:
  they strengthen the assembly between the parts made of composite material of the CMC type in a combustion module,
  they eliminate the disassociation of assembled parts in the combustion module during operation,
  they propose a removable assembly and disassembly of the anti-disengagement device on the chamber,
  they propose an alternative to the use of bolt type attachment,
  they limit the maintenance cost of the combustion chamber, and
  they are easily adapted to the existing turbomachines.

In general, the proposed solutions are simple, effective and economical to carry out and assemble on a turbomachine and an aircraft, while ensuring the safe assembly and disassembly of the combustion chamber (made of composite material parts) in a turbomachine.

The invention claimed is:

1. A combustion module for a turbomachine of an aircraft, the combustion module comprising:
  an annular casing extending around a longitudinal axis;
  an annular combustion chamber located inside the annular casing and having coaxial annular walls, respectively being an internal wall and an external wall, connected to each other by an annular bottom chamber, wherein:
    the internal wall, external wall, and the annular bottom chamber being formed by at least two annular envelopes;
    the at least two annular envelopes being made of a ceramic matrix composite material and having annular edges fitted together one inside the other and in axial abutment on each other; and
    the at least two annular envelopes include a first envelope and a second envelope;
  anti-disengagement devices configured to maintain the annular edges in axial abutment with each other, the anti-disengagement devices being carried by the annular combustion chamber and/or the annular casing; and
  fuel injectors carried by the annular casing and engaged in orifices of the first envelope of the at least two annular envelopes,
  wherein the anti-disengagement devices have washers which are mounted around the fuel injectors and tightened radially against the first envelope, and wherein the washers have lugs configured to cooperate by abutment and/or hooking with the second envelope of the at least two annular envelopes.

2. The combustion module according to claim 1, wherein the first envelope defines the external wall and the second envelope defines the internal wall and the annular bottom chamber, and wherein the annular edges are located at a junction of the external wall to the annular bottom chamber.

3. The combustion module according to claim 2, wherein the annular edges include a first annular edge of the first envelope, and wherein the first annular edge has a scalloped shape.

4. The combustion module according to claim 3, wherein the annular edges further include a second annular edge of the second envelope, and wherein the lugs each have a shape complementary to that of the second annular edge of the second envelope, and/or each have a hook shape for being engaged in an opening in the second envelope.

5. The combustion module according to claim 2, wherein each of the washers is interposed between the second envelope and a corresponding nut for tightening each of the washers against the second envelope.

6. The combustion module according to claim 5, wherein the corresponding nut is screwed onto a barrel of a tubular socket mounted around one of the fuel injectors, and wherein the socket comprises an annular abutment collar on a peripheral edge of the orifice in which the one of the fuel injectors is engaged.

7. The combustion module according to claim 1, wherein the lugs of each of the washers comprise two lugs oriented in substantially parallel directions.

8. The combustion module according to claim 1, wherein each of the washers is made of stainless steel.

9. The combustion module according to claim 1, wherein the annular combustion chamber is reverse flow.

10. A turbomachine for an aircraft, comprising a combustion module according to claim 1.

* * * * *